United States Patent [19]

Herrington

[11] Patent Number: 4,927,574
[45] Date of Patent: May 22, 1990

[54] WATER BATH FILM COOLING APPARATUS AND METHOD

[75] Inventor: Fox J. Herrington, Holcomb, N.Y.

[73] Assignee: Mobil Oil Corp., New York, N.Y.

[21] Appl. No.: 287,218

[22] Filed: Dec. 21, 1988

[51] Int. Cl.$^5$ .................................................. B29C 47/92
[52] U.S. Cl. .................................... 264/40.6; 264/557; 264/564; 264/179; 425/71; 425/72.1; 425/326.1; 425/143
[58] Field of Search ................. 264/40.6, 557–563, 264/566, 568, 179, 180; 425/72.1, 71, 143, 326.1

[56] References Cited

U.S. PATENT DOCUMENTS

| | | | |
|---|---|---|---|
| 2,804,642 | 9/1957 | Milne | 425/71 |
| 2,987,768 | 6/1961 | Given | 425/71 |
| 3,012,276 | 12/1961 | Given | 425/71 |
| 3,341,888 | 9/1967 | Bridge et al. | 425/71 |
| 3,388,197 | 6/1968 | Samways | 264/562 |
| 3,438,088 | 4/1969 | Westbrook | 425/71 |
| 3,513,501 | 5/1970 | Hearns | 425/140 |
| 4,192,637 | 3/1980 | Chong | 425/140 |
| 4,683,094 | 7/1987 | Sharps, Jr. | 425/326.1 |

FOREIGN PATENT DOCUMENTS 1476468  4/1967  France ........................... 264/178 R

*Primary Examiner*—Jeffery Thurlow
*Attorney, Agent, or Firm*—Alexander J. McKillop; Charles J. Speciale; James P. O'Sullivan, Sr.

[57] ABSTRACT

An apparatus for the production of a tubular thermoplastic film, and more particularly, a water bath film cooling apparatus for the rapid quenching of an extruded tubular thermoplastic film so as to enhance the speed of cooling thereof, and increase the strength of the film material. Also disclosed is a method of rapidly cooling a thermoplastic film material through the intermediary of a water bath, utilizing the inventive cooling apparatus. A predetermined internal pressure is maintained within the tube by a gaseous medium, such as air, which is slightly higher than the external pressure imparted to the film tube by the water bath, so as to enhance the speed of cooling of the film materials and increase the strength of the film by minimizing the premature crystallinity thereof upon extrusion of the film and passage through the cooling apparatus. The pressure differential between the interior and exterior of the film tube is maintained by an external liquid or water column acting on the pressurized gas or air being introduced into the thermoplastic film tube, and herein the height of the water column is correlated with the height of the external water bath surrounding the film tube so as to provide for the maintenance of a predetermined pressure differential between the inside and outside of the extruded film tube during its passage through the water bath.

15 Claims, 1 Drawing Sheet

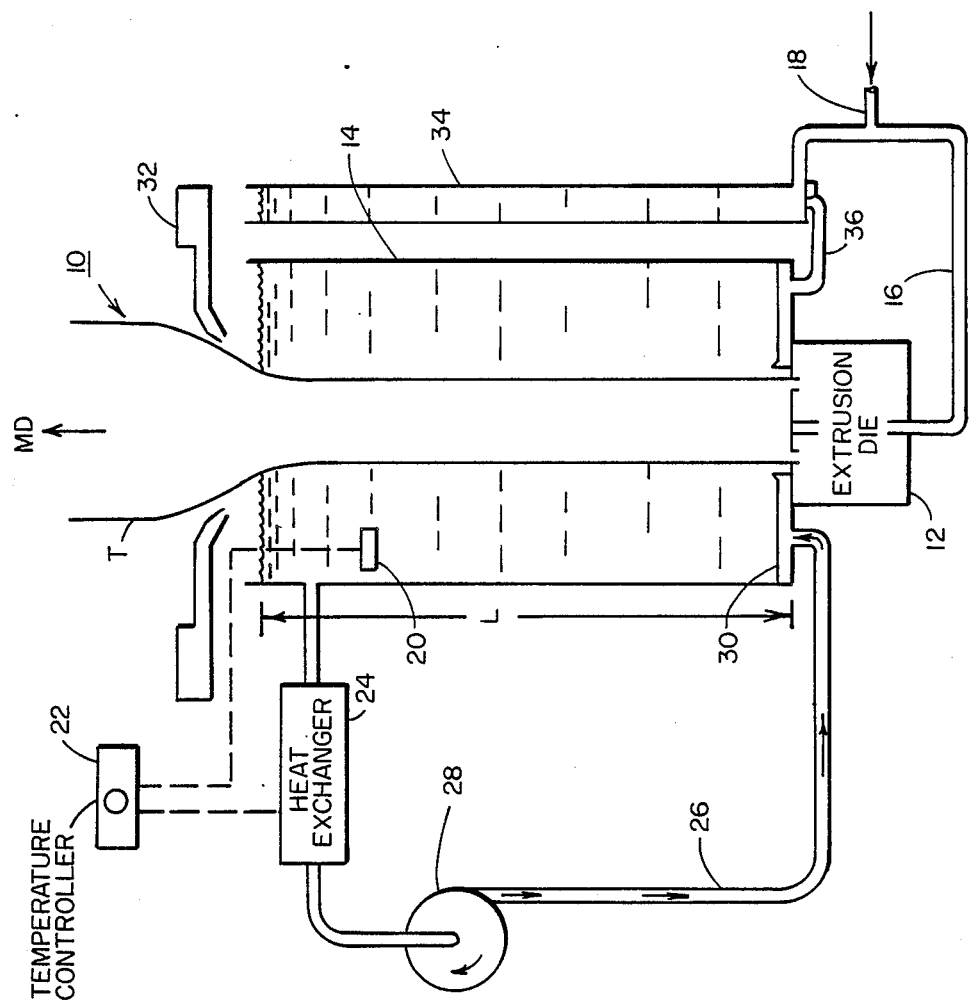

WATER BATH FILM COOLING APPARATUS AND METHOD

BACKGROUND OF THE INVENTION

1. Field of the Invention

The present invention relates to an apparatus for the production of a tubular thermoplastic film, and more particularly, relates to a water bath film cooling apparatus for the rapid quenching of an extruded tubular thermoplastic film so as to enhance the speed of cooling thereof, and increase the strength of the film material. Furthermore, the invention relates to a method of rapidly cooling a thermoplastic film material through the intermediary of a water bath, utilizing the inventive cooling apparatus.

The concept of utilizing a water bath for the cooling of a molten tubular film subsequent to the extrusion thereof is well known in the technology. In a more specific physical application, the tubular film is adapted to be extruded upwardly into a liquid bath, whereby the liquid, such as water, is arranged to externally encompass and contact the surface of the molten thermoplastic tubular film material. A concurrent flow of pressurized air which is supplied to the interior of the extruded molten film tube approximately balances the hydrostatic head of the liquid bath at generally the level of the extrusion die orifice. As the film tube is conducted upwardly, the hydrostatic head of the liquid, decreases, whereas the air pressure internally of the tube is maintained at a constant level so as to, resultingly, increase the pressure differential between the interior and the exterior of the film tube. Consequently, at some point along the upward path of travel of the tubular film, the pressure differential becomes sufficiently large so as to stretch the film and thereby orient the latter. In contrast with the foregoing, sheet film orientation is usually carried out by casting the base sheet into a water bath or onto a chill roll, thereafter stretching the film in the machine direction (MD) by superposing the film on successively more rapidly rotating rolls, and then stretching of the film in the transverse direction (TD) through the employment of a tenter frame.

Orientation of a tubular film web is, quite frequently implemented through the intermediary of a so-called double bubble. The base film is produced by extruding a tube through an annular extrusion die and thereafter freezing the molten tubular film by being contacted with water. Thereafter, the cooled tubular film is passed through a nip roll in order to isolate the internal pressure reigning in the tube, and then heated and inflated by a gaseous high-pressure medium into a second bubble. One method of obtaining the higher pressure in the second bubble is to employ a tubular probe extending through the mandrel of the extrusion die, and then through a notch which is formed in an intermediate nip roll. An alternative method resides in capturing a second bubble between two pairs of nip rolls, then moving the second pair closer to the first pair so as to reduce the length of the air column within the bubble, causing an increases in the internal pressure and laterally expanding the bubble which is constituted from the tubular film.

In essence, various thermoplastic film materials, particularly such as, but not limited to, polypropylene, polystyrene, polyester and high-density polyethylene can have their tensile strengths substantially enhanced through orientation. A small amount of orientation can be readily achieved through the bubble blowing process; however, any optimized degree of orientation can generally only be carried out and attained through a rather complex process, such as the above-mentioned double bubble extrusion, or with the application of a tenter frame.

The inventive method and apparatus is adapted to produce a high-clarity oriented tubular thermoplastic film at a high rate of production speed, with considerably less complexity than that currently employed in the technology, and may have ultimate commercial applications to plastic bag production or possibly consumer-oriented shrink film.

An orientation process for crystalline polymer films of the type considered herein may essentially follow at least some of four process steps:

1. Quenching the molten film material rapidly to approximately ambient temperature or even lower.
2. Heating the film material to an elevated temperature which is still significantly below the melting point.
3. Stretching the film material.
4. Heat setting the material by heating the film to a temperature just below the melting point and maintaining the temperature for a few seconds.

The purpose of Step 1, in essence, the rapid quenching or cooling of the film, is to quickly conduct the film material through the temperature at which any encountered crystallization is most rapid (immediately below the melting point) in order to minimize the crystallinity. This particular rapid cooling step is necessary inasmuch as a high degree of crystallinity imparts a high strength to the film material, consequently rendering it difficult to orient the film without causing fracture thereof.

The intent of Step 2 is to avoid the presence of any line drawing of the film material by heating the latter to above room or ambient temperature, the line drawing being essentially a discontinuity or an area of highly stretched film which is surrounded by a region of unstretched film material. This may occur when one particle of the film reaches the peak of a stress curve prior to adjacent thicker particles in the film which possess a lower stress because of their greater thickness. Once the thinner film region has passed the peak, the forces drop off, as a result of which the thicker particles are never pulled over the peak until the original particle is stretched far enough. When the film is heated, the stress-strain curve during the drawing thereof changes in a manner so that all points of the film are stretched continuously.

Step 3 merely relates to the stretching of the film in any normal manner well known in the art; whereas the purpose of Step 4; in effect, the heat setting, the latter of which is not essential for all types of oriented thermoplastic films, is primarily to stabilize the film so as to present the material from heat shrinking.

The present invention is essentially directed to the provision of a unique method and apparatus for imparting an improved degree of control over the bubble pressure reigning within the tubular film by bubbling air through a variable depth column of water, thereby facilitating a rapid quenching through an external water bath with a highly accurate regulation over the cooling conditions to thereby enable an increase in the speed of cooling and in the strength of the film material by minimizing the crystallinity thereof during the quenching or cooling sequence which is imparted to the molten film tube.

2. Discussion of the Prior Art

Although numerous apparatus and processes are currently known and employed in the thermoplastic tubular film extrusion technology which pertain to the cooling or quenching of a molten film subsequent to extrusion thereof; and with various of these being directed to cooling or quenching aspects through the intermediary of a water bath and the like, none of these enable the rapid cooling with an enhanced degree of control over the pressure differential existent between the internal and external surfaces of the tubular film.

Sims, Jr., et al. U.S. Pat. No. 4,203,942 disclose a process and apparatus for producing a tubular thermoplastic film, in which the film is drawn downwardly from an annular extrusion die through a cooling liquid bath prior to being collapsed between cooperating nip rolls. There is no disclosure of the inventive control between the internal and external pressure differential acting on a tubular film as it is advanced upwardly through a cooling or quenching water bath analogous to that contemplated by the present invention.

Stelmack U.S. Pat. No. 4,115,047 discloses an apparatus for quenching blown tubular film by passing a tubular film material through a liquid bath. Again, there is no precise correlation of the internal and external pressure differential which would allow for the rapid quenching and resultant increased strength in the film material without encountering the adverse effects of producing a premature film crystallinity.

Okada, et al. U.S. Pat. No. 4,308,192 disclose a method and apparatus for forming a double-layered film, in which each separate film layer is passed through a liquid bath subsequent to extrusion. There is no utilization of pressure differentials within and externally of a tubular film material analogous to that contemplated by the invention in order to improve upon the production efficiency.

Moreover, various similar types of water or liquid baths for cooling molten thermoplastic film are described in Trull U.S. Pat. No. 2,488,571; Wiggins, et al. U.S. Pat. No. 3,280,233; Uemura, et al. U.S. Pat. No. 3,932,080; Johnson U.S. Pat. No. 3,821,339; and Reichel, et al. U.S. Pat. No. 2,337,927, among numerous other publications pertaining to this technology. None of the prior art patents are adapted to provide for the accurate control and interrelationship between the internal pressure of the extruded tubular film and an external water bath so as to optimize the rapid quenching conditions providing for an increase in the cooling speed of the film and concurrently strengthen the film without adversely affecting the crystallinity thereof.

SUMMARY OF THE INVENTION

Accordingly, it is an object of the present invention to contemplate a method of forming a tubular thermoplastic film, in which the film is conducted upwardly through a cooling water bath subsequent to extrusion thereof from an annular extrusion die, and with a predetermined internal pressure being maintained within the tube by a gaseous medium, such as air, which is slightly higher than the external pressure imparted to the film tube by the water bath, so as to enhance the speed of cooling of the film materials and increase the strength of the film by minimizing the premature crystallinity thereof upon extrusion of the film and passage through the cooling apparatus.

A more specific object is to provide a method of the type described herein in which the pressure differential between the interior and exterior of the film tube is maintained by an external liquid or water column acting on the pressurized gas or air being introduced into the thermoplastic film tube, and wherein the height of the water column is correlated with the height of the external water bath surrounding the film tube so as to provide for the maintenance of a predetermined pressure differential between the inside and outside of the extruded film tube during its passage through the water bath.

Another object of the present invention is to provide for a circulating system for the water bath which will maintain the temperature of the liquid of the water bath within a predetermined range to prevent boiling thereof and to optimize the cooling action on the thermoplastic tubular film during its upward passage through the water bath.

A further object of the present invention is to provide for a cooling apparatus incorporating a water bath for rapidly cooling an extruded tubular thermoplastic film, employing the inventive method as described hereinabove.

BRIEF DESCRIPTION OF THE DRAWING

These and other objects and advantages of the invention may now be more readily ascertained from the following detailed description of an exemplary embodiment thereof, taken in conjunction with the accompanying single figure of drawing schematically illustrating a water bath employed in a tubular film forming apparatus for the rapid cooling or quenching of an extruded thermoplastic tubular film material.

DETAILED DESCRIPTION

Referring now in greater particularity to the drawing, there is generally schematically illustrated a tubular film forming apparatus including a water bath cooling arrangement 10. The apparatus is employed in conjunction with an annular extrusion die 12 for the contiguous extrusion of thermoplastic film materials, particularly a tubular film T which is preferably constituted of a high-density polyethylene, although numerous other types of thermoplastic polymers, such as polypropylene, polystyrene, polyester and the like may be readily improved in tensile strength by orientation thereof pursuant to the inventive apparatus and method. In particular, the inventive cooling bath arrangement 10 is adapted to be employed in implementing the above-mentioned Step 1 for rapidly quenching or cooling the molten, thermoplastic film tube T to below its freezing point upon exit from the extrusion die 12.

The inventive apparatus incorporates an annular water bath 14 encompassing the film tube T as the latter is drawn upwardly along the machine direction (MD) from the annular extrusion die 12.

The interior of the film tube T is expanded through the introduction of pressurized air from within the extrusion die 12 through a conduit 16 receiving the air at an inlet 18 which is connected to a suitable pressurized-air supply source (not shown). The water bath 14 is filled with a suitable cooling liquid; in this instance water, up to a level or height L above the discharge orifice of the extrusion die 12, with the temperature of the water being maintained at a required level or within a certain temperature range to enable effecting the optimum cooling of the extruded tubular film T.

The temperature of the water is maintained at the desired level by the locating of a temperature sensor 20 within the water bath 14, preferably near the upper cooler end thereof, with the sensor being connected to a temperature controller 22. The latter, in turn, is connected with a heat exchanger 24 interposed in a closed water flow circuit 26, respectively connected to the water bath at the upper end and lower ends thereof, and with a positive displacement pump 28 being connected in the circuit 26 downstream of the heat exchanger outlet so as to provide for a circulation of suitably heated and/or cooled water in the water bath 14, such temperature being either raised or lowered in response to signals transmitted to the temperature control 22 by the sensor 20. At the bottom of the water bath 14 there may be provided a water ring 30 to maintain rapid circulation of water and to prevent boiling thereof.

If desired, an air ring 32 may be positioned above the water bath 14 so as to effectuate further cooling of the expanded tubular film T, as is known in the tubular film extruding technology.

In order to maintain a predetermined pressure differential between the air pressure reigning interiorly of the film tube T and the hydrostatic pressure of the water in the water bath 14 acting on the external surface thereof, a water column 34 has its lower end communicating with the air conduit 16 and also with another conduit 36 connected to the lower end of the water bath 14 at water ring 30. This water column 34 is adapted to maintain the bubble pressure within the film tube T at a slightly higher level; for instance 1" of water higher than the pressure of the height of the water level L for the water bath 14.

Thus, when it is contemplated to implement rapid quenching or cooling of the molten thermoplastic film tube T as the latter is extruded from the annular die 12, without premature crystallization, this can be readily accomplished by the water bath 14 although the quenching temperature may not be low, inasmuch as the film material is thin exiting from the orifice of the annular extrusion die 12 and the heat transfer exerted by the water bath is extremely efficient. For example, the internal bubble pressure within the film tube T may be maintained so as to be controlled to 134" of water. Consequently, inasmuch as the height L or depth of the water bath 14 is 133", there is effectively maintained a 1" pressure differential within the film tube T or bubble at level of the extrusion die 12, which is so low as not to unduly stretch the molten film. As the film tube T is conducted upwardly through the water bath 14, the external pressure reduces so that the differential between the internal and external bubble pressure increases. However, at that point in time, the film tube has been cooled sufficiently so as to be ale to withstand the higher pressure. At a height of 132" upwardly from the extrusion die 12, there is present a 133" pressure differential, which is sufficient to commence stretching of the film tube or bubble, thereby orienting the film in a desired manner.

Inasmuch as problems may possibly be encountered once the film tube T begins to rapidly expand as it continues its travel upwardly beyond the height of the water bath, until the film tube could conceivably fracture, this aspect is compensated for by employing the air ring 32 which cools the film as the latter is blowing up in its lateral dimensions. Accordingly, as the film tube stretches laterally, it becomes cooler so as to become more resistant to drawing down; and inasmuch as thinner spots contain less heat in the material, the temperature at those locations drops even more rapidly so as to self-correct or compensate for any errors in the gauge of the extruded tubular film.

It is possible to contemplate that upon starting up the process of extrusion, the extruding of the melt is commenced with no water being present, and then as the water level in the water bath is raised, the internal bubble pressure is increased so as to always remain at 1" of water higher than the external pressure which is present at the level of the extrusion die 12. This satisfies any requirement that there always should be existent a small differential pressure at the location where the film is in a generally molten state; and the water level is raised until the differential becomes sufficiently large to cause the bubble or film tube to blow up or expand.

Although the process and apparatus have been described with regard to a stationary annular extrusion die 12, it is possible to contemplate the utilization of a counter-rotating extrusion die, which has a potential of creating interesting and novel film properties. However, such counter-rotating die, of necessity, may have a limited speed of rotation due to the tendency of the tubular film T to contract laterally as the film exits from the extrusion die. However, inasmuch as the water bath 14 allows for the utilization of extremely high internal bubble pressures, and since it cools the film extremely rapidly, this may provide a method of supporting the bubble against this contractive force until the film tube is essentially frozen or adequately cooled.

While there has been shown and described what is considered to be a preferred embodiment of the invention, it will, of course, be understood that various modifications and changes in form and detail could readily be made without departing from the spirit of the invention. It is therefore intended that the invention be not limited to the exact form and detail herein shown and described, nor to anything less than the whole of the invention herein disclosed as hereinafter claimed.

What is claimed is:

1. An apparatus for the production of a tubular thermoplastic film; comprising means for continuously extruding a seamless tube of molten film material in a generally upward direction; rapid quenching means for applying a liquid cooling medium to the external surface of said molten tubular film downstream of said extruding means; means for maintaining a pressure interiorly of said film tube during passage thereof through said liquid cooling medium; means for controlling the temperature of said liquid cooling medium; and means for maintaining a predetermined optimized pressure differential between the exterior of the film tube over the height of the liquid cooling medium and the interior of the film tube so as to thereby enhance the speed of cooling and increase the strength of the film material by minimizing the crystallinity thereof upon extrusion from said apparatus and passage through said quenching means.

2. An apparatus as claimed in claim 1, wherein said quenching means comprises a water bath encompassing said molten film tube.

3. An apparatus as claimed in claim 2, wherein said means for maintaining the pressure differential between the exterior and the interior of said film tube comprises a water column correlating the internal pressure of the film tube and the pressure of said water bath so as to maintain said differential between the external and internal pressure at a slightly higher predetermined pressure than that of the liquid cooling medium.

4. An apparatus as claimed in claim 3, wherein said internal pressure in said film tube is produced by a gaseous medium.

5. An apparatus as claimed in claim 4, wherein said gaseous medium comprises pressurized air.

6. An apparatus as claimed in claim 1, wherein said quenching means comprises a closed circulating system for said liquid cooling medium; a heat exchanger being interposed in said circulating system; and pump means for conducting said liquid cooling medium through said heat exchanger.

7. An apparatus as claimed in claim 6, wherein a temperature sensor is arranged in said liquid cooling medium in proximity to said film tube; and temperature control means connected to said heat exchanger and to said sensor for regulating the temperature of the liquid cooling medium in response to temperature changes sensed by said sensor deviating from a predetermined temperature level for said liquid cooling medium.

8. An apparatus as claimed in claim 6, comprising a water ring at the bottom of said quenching means for preventing the boiling of said liquid cooling medium.

9. A method for the production of a tubular thermoplastic film; comprising continuously extruding a seamless tube of molten film material in a generally upwardly directed orientation;; applying a liquid cooling medium to the external surface of said molten tubular film downstream of said extruding means for rapidly quenching said molten material; maintaining a pressure interiorly of said film tube during passage thereof through said liquid cooling medium; controlling the temperature of said liquid cooling medium; and maintaining a predetermined optimized pressure differential between the exterior of the film tube over the height of the liquid cooling medium and the interior of the film tube so as to thereby enhance the speed of cooling and increase the strength of the film material by minimizing the crystallinity thereof subsequent to extrusion and during said rapid quenching.

10. A method as claimed in claim 9, wherein said rapid quenching is effected by a water bath encompassing said molten film tube.

11. A method as claimed in claim 10, wherein the pressure differential between the exterior and the interior of said film tube is maintained by a water column acting on the internal pressure of the film tube so as to maintain said differential between the external and internal pressures at a slightly higher predetermined pressure than that of the liquid cooling medium.

12. A method as claimed in claim 11, wherein said internal pressure in said film tube is produced by a gaseous medium.

13. A method as claimed in claim 12, wherein said gaseous medium comprises pressurized air.

14. A method as claimed in claim 9, wherein said rapid quenching includes circulating said liquid cooling medium and controlling the temperature of said liquid cooling medium.

15. A method as claimed in claim 14, wherein said temperature is sensed in said liquid cooling medium in proximity to said film tube; and regulating the temperature of the liquid cooling medium in response to sensed temperature changes deviating from a predetermined temperature level for said liquid cooling medium.

* * * * *